Patented Oct. 31, 1950

2,527,948

UNITED STATES PATENT OFFICE 2,527,948

PRODUCTION OF DIALKYL POLYSULFIDES

Joseph P. Lyon, Jr., Phillips, Tex., and Willie W. Crouch, Bartlesville, Okla., assignors to Phillips Petroleum Company, a corporation of Delaware No Drawing. Application September 2, 1948, Serial No. 47,552

8 Claims. (Cl. 260—608)

This invention relates to a process for sulfurizing organic compounds and more particularly relates to the sulfurization of organic polysulfides. In one of its aspects it relates to a process for the production of dialkyl polysulfides and in one of its most particular modifications to the production of dialkyl trisulfides from dialkyl disulfides.

Dialkyl polysulfides and particularly dialkyl trisulfides have been found useful for many purposes such as additives for elastomers, antioxidants for lubricating oils, intermediates for production of valuable organic chemicals, insecticides, germicides, and particularly as an additive to Diesel fuels to improve the cetane number and ignition qualities of these fuels. These compounds have also been found useful in the compounding of extreme pressure lubricants and in the acceleration of rubber treating processes.

The preparation of these compounds, however, has been a problem of considerable difficulty from an industrial standpoint. Dialkyl polysulfides have heretofore been produced by the interreaction of mercaptans with sulfur monochloride or with sulfur dichloride. When this process is used the principal product is a dialkyl tetrasulfide which is converted at least partially to the trisulfide by fractionating under conditions regulated to favor such degradative conversion. An obvious disadvantage of this procedure lies in the use of the sulfur chloride, which involves additional equipment, materials, operational costs and the necessity for purifying the product, which is obtained contaminated with various by-products. Dialkyl disulfides have also been converted to polysulfides in the presence of molecular sulfur and a basic catalyst such as various organic amines. This process likewise produces a product contaminated with side-reaction products and the basic catalyst must also be neutralized before separation to obtain a pure product. This general process of combining sulfur with mono- or poly-sulfides is generally designated as sulfurization and is so defined in the present discussion and claims. Simple addition of sulfur to the sulfides without reaction promoters is possible but is undesirably slow. Thus the previous methods of preparation while generally satisfactory have involved various operational disadvantages.

An object, therefore, of the present invention is to provide an improved process for the preparation of dialkyl polysulfides from organic sulfides having fewer sulfur atoms.

Another object of the present invention is to provide an improved process for the preparation of dialkyl trisulfides.

A still further object of the present invention is to provide a novel catalyst for the sulfurization of dialkyl polysulfides with sulfur to produce dialkyl polysulfides having at least one additional sulfur atom per molecule.

Another object is to provide a process for the catalytic sulfurization of dialkyl disulfide with sulfur in the presence of a catalyst comprising phosphorus pentasulfide to produce dialkyl polysulfides of at least one more sulfur atom per molecule.

A still further object of the present invention is to provide a process for the preparation of dialkyl trisulfides in which a dialkyl disulfide reacts with elemental sulfur catalyzed by the presence of phosphorous pentasulfide.

Other objects will be apparent to one familiar with the art from the accompanying discussion of the invention.

We have now discovered a process for the production of dialkyl polysulfides from the interaction of sulfur with corresponding dialkyl polysulfides lower in sulfur content than that desired, wherein a substantial reduction in reaction time and increased yields are effected by the use of phosphorus pentasulfide as a catalyst. Even a relatively small amount of this inorganic compound is found to be especially effective in catalyzing the sulfurization of dialkyl sulfides. For example, in the usual conversion of dialkyl disulfides to corresponding trisulfides employing elemental sulfur, we have found that as much as 40 or more hours at a temperature of 300° F. may be required to effect a conversion of about 50 per cent while by the present process using a catalyst comprising phosphorus pentasulfide, a higher conversion and yield may be obtained in from 10 to 25 hours at the same temperature. Conversions in the presence of phosphorus pentasulfide are found to proceed at such a rate that, when an amount of sulfur sufficient to produce a desired polysulfide is introduced into admixture with the reactant sulfide and catalyst at conversion conditions, no substantial amount of unconverted sulfur can be detected in the reaction mixture 12 to 20 hours after the reaction is started. In either case, a somewhat more rapid conversion may be obtained at higher temperatures, but this is undesirable since decomposition of starting material and of the product takes place at these higher temperatures with a corresponding reduction in yield, and with contamination of the product.

In the practice of our invention, a dialkyl sulfide is admixed with the calculated amount of elemental sulfur to produce the desired polysulfide and to the mixture is added 0.25 to 3.0 weight per cent, preferably 0.5 to 1.5 weight per cent, of phosphorus pentasulfide based on total reactant charge. For instance in the preparation of a dialkyl trisulfide, the catalyst may be admixed with equimolecular proportions of elemental sulfur and the corresponding dialkyl disulfide, and the conversion conducted at a temperature between 250 and 350° F., preferably between about 280 and 320° F. At this temperature the reactants form two liquid phases, one of which comprises molten sulfur and the other of which comprises a solution of sulfur in the disulfide. The reaction is maintained under sufficient pressure to retain the reactants in the liquid phase at the reaction temperature. The reactant phases are constantly agitated and thoroughly admixed, with reaction taking place between the disulfide and sulfur to produce the dialkyl trisulfide. As the reaction proceeds, the separate phases disappear and the system becomes homogeneous. After a reaction time of about 10 to 20 hours under these conditions, the reaction is complete and a test of the reaction mixture will show substantially no unconverted free sulfur. The reaction is discontinued and the effluent is fractionated, preferably under reduced pressure below about 10 mm. of mercury, to separately recover the unreacted dialkyl disulfide, the dialkyl trisulfide product and a heavier product. Kettle temperatures during fractionation should not exceed 300 to 350° F. The unreacted disulfide may be returned to the feed or to storage for subsequent conversion and the trisulfide may be stored and combined with subsequent products from the process.

The process of our invention is applicable to the manufacture of various dialkyl polysulfides and, under general conditions given, is particularly adaptable to the preparation of dialkyl trisulfides. The process is found to be especially adaptable to the manufacture of organic polysulfides in which dialkyl disulfides containing various alkyl groups may be converted to polysulfides. Under the preferred conditions of the process those disulfides having alkyl groups which contain one to fourteen carbon atoms of either primary, secondary or tertiary configuration are particularly suitable. The specific conditions in the reactor will, of course, depend upon the sulfide being reacted. For example, with low boiling sulfide reactants, the reaction will be conducted under sufficient super-atmospheric pressure to maintain liquid phase conditions at the operating temperature while, with those boiling at about the optimum reaction temperature, the reaction may be operated at substantially atmospheric pressure and with suitable reflux condensers to prevent the loss of material. When reacting higher boiling feed stocks such as ditertiary butyl disulfide, the reaction may be conducted below the boiling point and at atmospheric pressure. Reaction temperatures between about 250° and 350° F. are desirable and an operating temperature of about 300° to 320° F. may be preferred. It is particularly desirable to maintain at least a 1:1 ratio of sulfur to sulfide for the preparation of a polysulfide having one additional sulfur atom per molecule in the product, and for higher additions, higher ratios of sulfur to sulfide may be used. The mixture of sulfide, sulfur and catalyst may be reacted between 10 to 20 hours per conversion cycle under the preferred conditions, although it is possible to employ a shorter reaction time with lower conversion and more frequent separation or to employ a higher reaction temperature at the expense of more loss and lower yield by decomposition and greater contamination.

The following comparative examples are illustrative of the process and show the advantages obtained by the use of phosphorus pentasulfide in the sulfurization of dialkyl polysulfides. The results of tests to determine the catalytic action of a number of compounds related to phosphorus pentasulfide are reported in the first example. In each of the examples two reactors were fitted with reflux condensers and mechanical stirring means. The same conditions were maintained and the same amounts of reactants were introduced into each reactor during each experiment with the exception that in one of the reactors the indicated amount of phosphorus pentasulfide catalyst, or similar compound as shown, was added to the reaction mixture. Tests were made at the end of 15 and 20 hours reaction time, respectively, upon a 5 milliliter sample from each reaction mixture to determine the amount of sulfur unreacted. The samples were tested by adding 25 milliliters of acetone to the sample, cooling the mixture in ice water and filtering to separate unreacted sulfur. The reactants were a disulfide and sulfur. At the end of the reaction periods indicated, the samples were fractionated under refluxing conditions and reduced pressure to recover unreacted disulfide, trisulfide product, and heavier reaction product containing the catalyst. The amount of unreacted disulfide recovered is shown and is an indication of the amount of disulfide reacted; and also the per cent of trisulfide based on the amount of charge is shown.

Example I

Two reactors were fitted with reflux condensers and mechanical stirrers. Into each reactor was introduced a mixture of 178 grams of ditertiary butyl disulfide and 32 grams of sulfur. A catalyst as shown was added to the reaction mixture in one reactor while the other reactor was operated without catalyst as a control. The temperature in the reactors was elevated to 300° F. and maintained at this level with continuous agitation of the contents throughout the reaction. At the end of 15 and 20 hours, respectively, samples from each reaction mixture were tested by diluting the samples in 25 ml. of acetone, cooling in ice water and filtering to recover unreacted sulfur. Under these conditions the following results were obtained:

| Catalyst | Catalyst Charge (Per Cent Total Chg.) | Unreacted Sulfur (gms./5 mls.) | |
|---|---|---|---|
| | | After 15 hrs. | After 20 hrs. |
| None | | 0.331 | 0.233 |
| Phosphorous pentasulfide | 1.0 | <0.001 | <0.001 |
| Do | 0.5 | <0.001 | <0.001 |
| Antimony sulfide | 1.0 | 0.359 | not tested |
| Arsenic sulfide | 1.0 | 0.322 | not tested |
| Nickelous oxide | 1.0 | 0.354 | 0.271 |
| Vanadium pentoxide | 1.0 | 0.331 | 0.279 |
| Cobaltic oxide | 1.0 | 0.385 | 0.356 |
| Ferric oxide | 1.0 | 0.381 | 0.257 |
| Stannic oxide | 1.0 | 0.345 | 0.253 |
| Aluminum oxide | 1.0 | 0.405 | 0.326 |
| Molybdenum oxide | 1.0 | 0.325 | 0.270 |

The uncatalyzed reaction was continued for a total reaction time of 34 hours and a test of the reaction mixture at the end of this period showed an amount of unchanged sulfur which indicated a conversion of only 50 per cent.

Example II

Two flasks were set up and charged as in Example I, a catalyst comprising 0.5 weight per cent of phosphorus pentasulfide being introduced into one flask while the other was operated as a control. After 20 hours reaction at 300° F. the mixture from the flask containing the catalyst was removed and fractionated to recover unreacted ditertiary butyl disulfide and isolate ditertiary butyl trisulfide. The uncatalyzed mixture was allowed to react an additional 16 hours thus providing a total reaction time of 36 hours for the uncatalyzed mixture after which fractionation was carried out. The fractionation was conducted at 5 mm. pressure using reflux ratios of 2:1 or lower. The kettle temperature in the distillation was never allowed to exceed about 350° F. The disulfide was separated at a head temperature of 145–150° F. and the trisulfide was separated at a head temperature of 185–190° F. Data on the two reactions are shown below:

| Catalyst | Reaction Time | Disulfide Recovered (Wt. Per Cent) | Trisulfide (Wt. Per Cent of Charge) |
|---|---|---|---|
| 0.5% $P_2S_5$ | 20 | 38.6 | 37.0 |
| None | 36 | 48.1 | 29.7 |

Example III

The experiment of Example II was repeated using the same charging ratio and amount of catalyst. The catalyzed and uncatalyzed reactions were both conducted at 325° F. and continued for 24 hours after which the mixtures were fractionated as before. Data in these runs are tabulated below:

| Catalyst | Reaction Time | Disulfide Recovered (Wt. Per Cent) | Trisulfide (Wt. Per Cent of Charge) |
|---|---|---|---|
| 0.5% $P_2S_5$ | 24 | 21.6 | 52.7 |
| None | 24 | 30.7 | 46.6 |

As shown by the preceding examples, the catalytic action of phosphorus pentasulfide is found to be highly specific in the sulfurization of dialkyl sulfides under the conditions of the present invention. A number of related compounds from the same and adjoining groups and series of elements, which might be expected from their usual similarity of properties to show catalytic action comparable to phosphorus pentasulfide were tested but failed to accelerate the sulfurization and, in some instances, even retarded the reaction rate. For example, the sulfides of arsenic and antimony of the same sub-group as phosphorus in the arrangement of the elements showed little or no acceleration of the sulfurization reaction. Other experiments with the oxides of related metals likewise disclosed negative catalytic action as shown by the results tabulated in Example I. Even prolonged reaction in the absence of phosphorus pentasulfide failed to give comparable conversion. From the latter examples it is readily seen that the amount of polysulfide which is sulfurized and the yield of sulfurized polysulfide obtained during conversion in the presence of phosphorus pentasulfide is substantially greater than that obtained from the uncatalyzed reaction even when the uncatalyzed reaction is allowed a nearly double reaction time. The examples also show that greater conversion and yield are possible at higher temperatures within the preferred conversion range and that a substantially better yield and higher reaction rate may be obtained when employing the phosphorus pentasulfide catalyst at these higher reaction temperatures.

The yield of any particular substituted product may be further increased by the conditions of fractionation. As mentioned before, better recovery of polysulfide products is obtained by fractionating the reaction product under reduced pressure. Due to the degradative tendencies of the more highly sulfur substituted polysulfides during distillation, it is possible to recover a product fraction of various compositions depending upon the temperature and pressure and upon the refluxing conditions under which the distillation is conducted. For example, if it is desired in the sulfurization of a disulfide to obtain a trisulfide product substantially free from higher polysulfides, a relatively long packed distillation column and a reflux ratio of about 2:1 may be employed during the distillation. On the other hand, if a higher polysulfide or polysulfide mixture is desired, the distillation may be effected in a shorter column provided with less packing and operated without reflux.

The products of the present invention are exceptionally free from contaminating products inasmuch as the reaction is substantially confined to the production of desired products. Under some conditions of recovery, the products may be contaminated by minor amounts of hydrogen sulfide and mercaptans which result from decomposition of the products. Further purification may be effected by low pressure refractionation, stripping under vacuum, caustic washing and drying, and similar conventional treatment. For many uses the degree of purity is sufficiently high for utilization of the compounds directly from the first fractionation, without more refined treatment. It has been observed that the slightly contaminated products and the reactants tend to be corrosive over a period of time, especially to ordinary steel equipment and it is recommended that equipment resistant to sulfur corrosion be employed.

Inasmuch as the foregoing description comprises preferred embodiments of the invention, it is to be understood that various changes and modifications may be made therein without departing from the scope which is inherent with the invention. Likewise, various related organic sulfides other than those specifically disclosed may be substituted in the process and the advantages of the process realized.

We claim:

1. A process for the sulfurization of an organic dialkyl polysulfide which comprises contacting said polysulfide with elemental sulfur in the presence of phosphorus pentasulfide under sulfurizing conditions whereby said polysulfide reacts with said sulfur with the addition of at least one sulfur atom per molecule.

2. A process for converting an organic dialkyl polysulfide into a sulfurized polysulfide having at least one more sulfur atom per molecule which comprises contacting said dialkyl polysulfide with elemental sulfur under sulfurizing conditions in the presence of phosphorus pentasulfide.

3. A process for the sulfurization of an organic dialkyl sulfide which comprises contacting said dialkyl sulfide with elemental sulfur at a temperature between 250 and 350° F. in the presence of phosphorus pentasulfide, distilling a resulting mixture under reduced pressure, and separately recovering sulfurized polysulfide having at least one more sulfur atom per molecule than said dialkyl sulfide.

4. A process for converting an organic dialkyl polysulfide into a sulfurized polysulfide having at least one more sulfur atom per molecule which comprises contacting said dialkyl polysulfide with elemental sulfur under sulfurizing conditions in the presence of 0.5 to 3.0 weight per cent phosphorus pentasulfide.

5. A process for the preparation of a dialkyl trisulfide from a corresponding dialkyl disulfide which comprises contacting said disulfide with elemental sulfur at a temperature between 250 and 350° F. in the presence of phosphorus pentasulfide.

6. A process for the preparation and recovery of a dialkyl trisulfide from a corresponding dialkyl disulfide which comprises contacting said disulfide with elemental sulfur at a temperature between 250 and 350° F. in the presence of phosphorus pentasulfide, distilling a resulting mixture under reduced pressure and continuous reflux, and seperately recovering said dialkyl trisulfide.

7. A process for the preparation of ditertiary butyl trisulfide from ditertiary butyl disulfide which comprises contacting said disulfide with elemental sulfur at a temperature between 300 and 325° F. in the presence of about 0.5 weight per cent of phosphorus pentasulfide, distilling a resulting mixture under reduced pressure and continuous reflux, and separately recovering said ditertiary butyl trisulfide.

8. A process for the production and recovery of a dialkyl trisulfide from a corresponding dialkyl disulfide having alkyl groups containing from one to fourteen carbon atoms which comprises; admixing equimolecular proportions of elemental sulfur, said dialkyl disulfide and from 0.5 to 1.5 weight per cent of phosphorus pentasulfide based on total weight of a resulting mixture; reacting said sulfur and said dialkyl disulfide present in said mixture in liquid phase, at a temperature of from 250 to 350° F. and for a period of time of from 10 to 20 hours, agitating said mixture during said reacting; and fractionally distilling a mixture resulting from said reacting at a kettle temperature not in excess of 350° F., thereby recovering unreacted dialkyl disulfide and dialkyl trisulfide product.

JOSEPH P. LYON, Jr.
WILLIE W. CROUCH.

REFERENCES CITED

The following references are of record in the file of this patent:

UNITED STATES PATENTS

| Number | Name | Date |
| --- | --- | --- |
| 2,237,627 | Olin | Apr. 8, 1941 |
| 2,309,692 | Chittick | Feb. 2, 1943 |

Certificate of Correction

Patent No. 2,527,948 October 31, 1950

JOSEPH P. LYON, Jr., ET AL.

It is hereby certified that error appears in the printed specification of the above numbered patent requiring correction as follows:

Column 5, line 21, for "350° F." read *330° F.*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*